United States Patent [19]

Matthys

[11] Patent Number: 4,963,744
[45] Date of Patent: Oct. 16, 1990

[54] METHOD AND APPARATUS FOR PROVIDING ACCURATE LOW NOISE DEMODULATION

[75] Inventor: Robert J. Matthys, Minneapolis, Minn.

[73] Assignee: Gas Research Institute, Chicago, Ill.

[21] Appl. No.: 371,200

[22] Filed: Jun. 26, 1989

[51] Int. Cl.$^5$ .................... G01N 21/17; G01N 21/35; G01N 21/61
[52] U.S. Cl. .................. 250/343; 250/338.1; 250/339; 250/351; 250/564
[58] Field of Search .................. 370/20; 358/464, 42, 358/213.15, 213.16, 213.17; 375/17, 20, 98, 76, 102; 329/311; 250/343, 351, 339, 338.1, 564

[56] References Cited

U.S. PATENT DOCUMENTS

| | | | |
|---|---|---|---|
| 3,790,797 | 2/1974 | Sternberg et al. | 250/345 |
| 4,029,416 | 6/1977 | Hawes | 356/51 |
| 4,606,047 | 8/1986 | Wilkinson | 375/38 |
| 4,678,914 | 7/1987 | Melrose et al. | 250/343 |
| 4,782,232 | 11/1988 | Bernstein et al. | 250/343 |
| 4,874,572 | 10/1989 | Nelson et al. | 376/256 |
| 4,874,949 | 10/1989 | Harris et al. | 250/343 |

Primary Examiner—Constantine Hannaher
Assistant Examiner—Edward J. Glick
Attorney, Agent, or Firm—Haugen and Nikolai

[57] ABSTRACT

A method and apparatus for accurate low noise demodulation of a modulated multi-signal input waveform. The multi-signal input waveform includes a plurality of sequential signal pulses, each pulse having a first adjacent background signal immediately preceding it and a second adjacent background signal immediately following it in time. The invention provides apparatus for synchronously separating the sequential signal pulses and apparatus for synchronously demodulating each sequential signal pulse. The separating apparatus separates each sequential signal pulse together with its adjacent background signals into one of a plurality of channels according to the sequence order of the pulse. Once the sequential signal pulses are separated into separate channels together with their background signals, the demodulating apparatus in each channel averages the first and second adjacent background signals for each pulse to yield an adjacent average background signal. Each sequential signal pulse is then subtracted from its adjacent average background signal to yield the final demodulated signal, each in its separate amplifier channel parallel to the other channels.

7 Claims, 3 Drawing Sheets

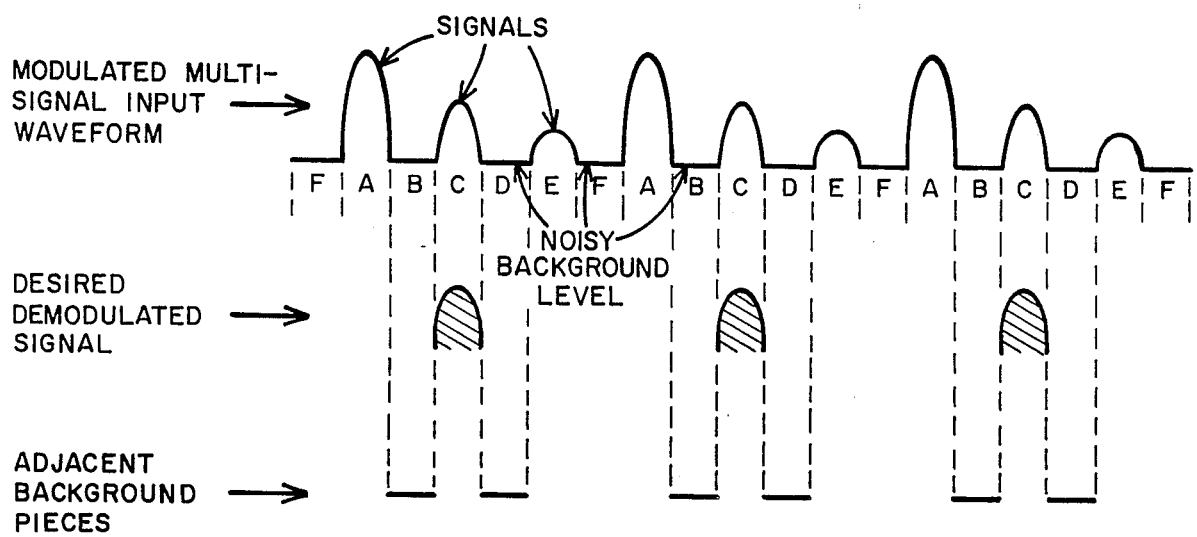
Fig. 1
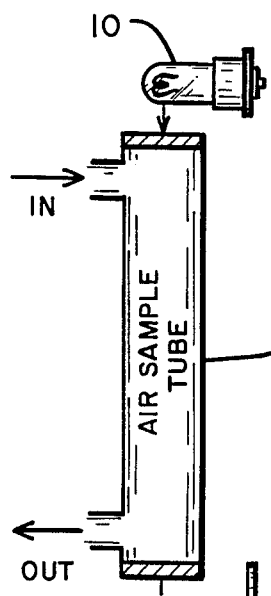
Fig. 2
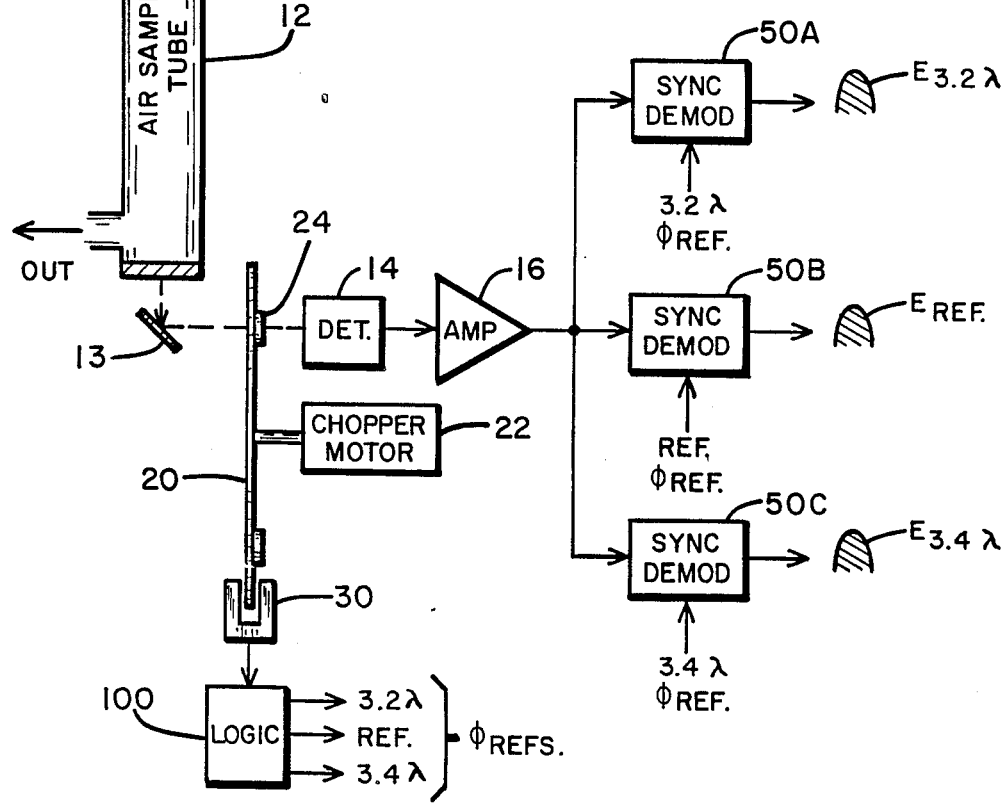

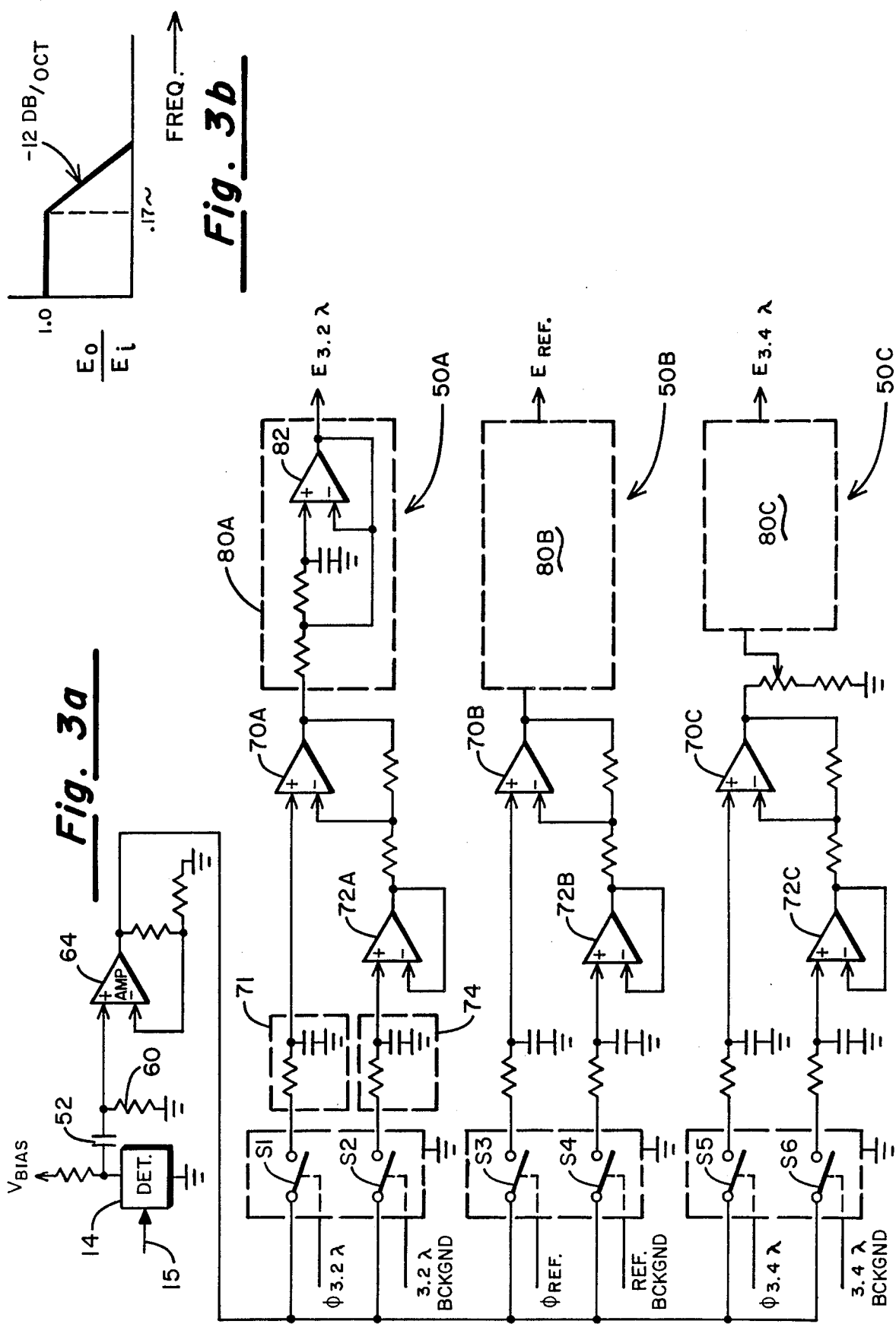

4,963,744

METHOD AND APPARATUS FOR PROVIDING ACCURATE LOW NOISE DEMODULATION

FIELD OF THE INVENTION

The invention is directed generally to a method and apparatus for providing demodulation of modulated multi-signal input waveforms and, more particularly, to a method and apparatus for accurate low noise demodulation of a modulated multi-signal input waveform for use in gas detection systems.

DISCUSSION OF THE PRIOR ART

Many electro-optical instruments use mechanical chopping wheels in an optical path in front of an electronic detector. Such mechanical chopping wheels amplitude modulate the detector signal and permit signal recovery after the modulated signal has passed through an AC coupled detector amplifier. The amplitude of the signal at the output of the AC coupled amplifier is the difference between the signal's peak amplitude and background level in between the signal pulses. Such chopping wheels sometimes include filters, mirrors, attenuators and similar elements to generate or obtain multiple optical signals at the detector.

In a typical system, the detector used is DC biased at a level which is orders of magnitude higher than the detected signal. Hence, the need for AC coupling the detector signal to the downstream demodulation electronics. If the signal out of the detector is low, which is the usual situation, then the inherent noise in the detector output corrupts the signal to a significant degree. The noise presents a problem in separating out (or demodulating) the multiple signals in the modulated waveform into individual signals with the least amount of noise corrupting the signals. In known demodulation techniques, all of the pieces of the background level are separated out and added together into a common background signal. The sequential optical signal pulses are also separated out individually and subtracted from the common background signal to obtain the individual signal amplitudes. Such approaches lack accuracy because they do not use the localized average of the background level immediately before and immediately after the signal pulse being demodulated. The localized average would give the best possible measure of the background level during the actual signal pulse and result in the most accurate demodulation possible. In contrast to such known approaches which use a common background signal to obtain individual signal amplitudes, the invention provides a method and apparatus which instead subtracts each individual signal from the two background pieces immediately adjacent to it in time.

For minimum noise, the background level which occurs simultaneously with each signal pulse interval would be the best background level to use in determining the desired signal's amplitude. Unfortunately, this is inherently not available since the noise components are not separable from the signal itself. The invention takes advantage of the next best approach by taking an average of the two adjacent background signals. In this way, cross coupling effects between the modulated signals themselves due to the AC amplifier coupling are also minimized. This new approach also allows the least amount of noise to pass through the demodulator, since the noise on any unused background signal pieces do not pass through the demodulator. As a result, the invention provides a demodulator that yields the most accurate signal amplitude with the least noise feedthrough.

OBJECTS OF THE INVENTION

It is one object of the invention to provide a method and apparatus for accurate low noise demodulation of modulated multiple signal input waveforms through subtracting individual sequential signals from their adjacent background signals.

It is yet another object of the invention to provide an accurate low noise demodulation technique for use in a natural gas detection system.

Other objects, features and advantages of the invention will become apparent to those skilled in the art through the description of the preferred embodiment, claims and drawings wherein like numerals refer to like elements.

SUMMARY OF THE INVENTION

A method and apparatus for accurate low noise demodulation of a modulated multi-signal input waveform is provided. The multi-signal input waveform includes a plurality of sequential signal pulses, each pulse having a first adjacent background signal immediately preceding it and a second adjacent background signal immediately following it in time. The invention provides means for synchronously separating the sequential signal pulses and means for synchronously demodulating each sequential signal pulse. The separating means separates each individual sequential signal pulse together with its adjacent background signals into one of a plurality of channels according to the sequence order of the pulses. Once the sequential optical signal pulses are separated into individual channels together with their background signals, the demodulating means in each channel averages the first and second adjacent background signals for each pulse, to yield an adjacent average background signal. Each sequential signal pulse is then subtracted from its adjacent average background signal to yield the final demodulated signal. In one embodiment of the invention, the sequential signal pulses are optical pulses in the wavelength range of about 3 to 4 microns.

BRIEF DESCRIPTION OF THE DRAWINGS

FIG. 1 illustrates the recovery of a desired demodulated signal from a modulated multi-signal input using the method of the invention.

FIG. 2 is a block diagram of a natural gas detection system employing one example of an embodiment of the invention.

FIGS. 3a and 3b are detailed electrical schematics of a portion of the apparatus of the invention.

DESCRIPTION OF THE PREFERRED EMBODIMENT

Figure 6:
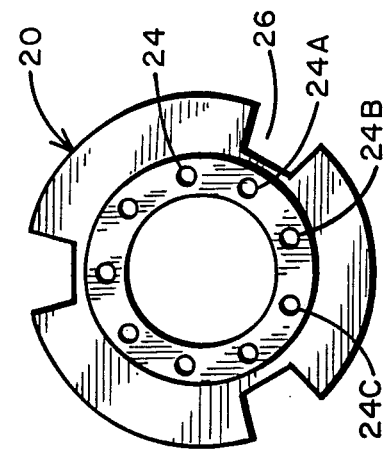
FIG. 6 is a front view of one example of a chopper wheel employed by an embodiment of the apparatus of the invention.

Referring now to FIG. 2, a block diagram of one example of an embodiment of the invention is shown as used in a natural gas detection system. By way of illustration and not by way of limitation, the invention will be described herein with reference to the specific embodiment shown in FIG. 2. However, those skilled in the art will recognize that the method and apparatus of the invention is not limited by the specific embodiment illustrated in FIG. 2, and that many variations of the invention are possible.

The system shown in FIG. 2 includes a tungsten light source 10 and air sample tube 12, a light detector 14, an amplifier 16, a chopper wheel 20 connected to chopper motor 22, and a plurality of optical filters 24. The apparatus further includes an optical beam interruption circuit 30 coupled to decoding logic 100. A plurality of synchronous demodulation circuits 50A, 50B, and 50C are electrically connected to the amplifier 16.

Referring now to FIG. 6, a front view of the chopper wheel 20 as used in one embodiment of the invention is shown. The chopper wheel 20 includes a plurality of synchronization slots 26 and optical filters 24. In the example shown in FIG. 6, one section of the chopper wheel includes three sequential optical filters 24A, 24B, and 24C. The optical filters may advantageously be responsive to different wavelength absorption bands. The number of sequential filters used and the wavelengths which are passed by such filters depend upon the application (i.e., the type of gas being sampled).

Now referring to FIG. 2, in one embodiment of a natural gas detection system built by Honeywell Inc. of Minneapolis, Minn., a chopper wheel was employed including three sets of three optical filters arranged such that the first filter in the set was responsive to a wavelength of about 3.2 microns, the second filter was responsive to a broad reference wavelength and the third filter in the set was responsive to a wavelength of about 3.4 microns. The slots or edge notches 26 provide synchronization means for the synchronous demodulation circuits 50A through 50C when processed through decoding logic 100.

Figure 4:
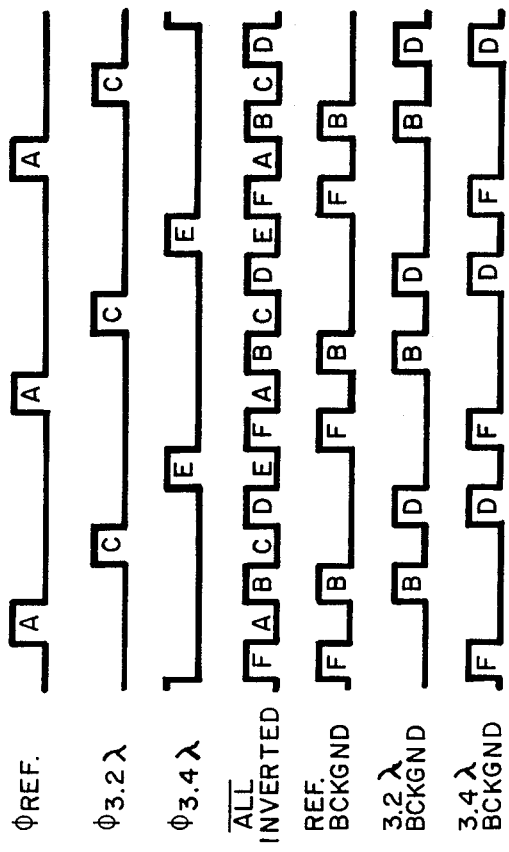
FIG. 4 illustrates an example of synchronization signals employed by one example of an embodiment of the invention.

In operation, the chopper motor 22 rotates the chopper wheel 20 so as to cause the synchronizing notches 26 to act as synchronizing gates which are used by the decoding logic 100. Decoding logic 100 converts the optical gating information into phase reference logic signals as shown in FIG. 4 and as utilized by the control logic shown in FIG. 5. At the same time, the optical filters 24 result in a signal output from detector 14 into amplifier 16 which is an amplitude modulated multi-signal input waveform. Amplifier 16 then adds gain to the multi-signal input waveform which is subsequently separated and synchronously demodulated by circuits 50A, 50B, and 50C to provide demodulated signals $E_{3.2\lambda}$, $E_{REF}$ and $E_{3.4\lambda}$. The signals are then fed into signal processing electronics (not shown) for metering and displaying gas detection information.

FIGS. 3a and 3b show a detailed circuit diagram of a portion of the embodiment of the invention shown in block diagram form in FIG. 2. In FIG. 3a optical detector 14 is shown biased by a DC voltage in the range of about 30 volts. Optical detector 14 receives optical signals 15 which are passed through the filters 24 as shown in FIG. 2. The output of detector 14 is then AC coupled by means of coupling capacitor 52 into an amplifier 64 which adds gain to the detector signal. The output of amplifier 64 is then fed into synchronous demodulation circuits 50A, 50B, and 50C through synchronous switches S1, S2, S3, S4, S5, and S6. The signals are decoded into the proper channels 50A, 50B, or 50C using the switch control signals labeled $\phi_{3.2\lambda}$, $3.2\lambda_{BCKGND}$, $\phi_{REF}$, $REF_{BCKGND}$, $\phi_{3.4\lambda}$, and $3.4\lambda_{BCKGND}$ to control switches S1–S6. The operation of these control signals will be explained in detail further herein below with respect to FIGS. 4 and 5.

Each of the three synchronous demodulation circuits 50A, 50B and 50C operates similarly. Therefore, the operation of only one of the circuits will be detailed here with the understanding that the other circuits operate in similar fashion to demodulate and separate out the other modulated signals. Referring now to synchronous demodulator circuit 50A when switch S1 is closed in response to control signal $\phi_{3.2\lambda}$, the sequential signal pulse passed through the 3.2λ filter 24A will be passed through to an RC averaging filter 71 into summing amplifier 70A. Similarly, when switch S2 is closed in response to the control signal labeled $3.2\lambda_{BCKGND}$, the background signals immediately preceding and immediately following the sequential signal pulse are passed through by switch S1 to a second RC averaging filter 74 and then to amplifier 72A. The filter time constants are selected to average the signals over the switch closure times of switches S1 and S2. Note in FIG. 3a that for minimum demodulator noise feedthrough the filtering time constants for filters 71 and 74 are different. The time constant for the signal pulse portion (71) depends upon the time width of the signal pulse. Similarly, the time constant for the background portion (74) depends upon the time width of the background level. In one embodiment of the invention, RC filter 74 has an RC time constant of about 0.051 seconds.

The operation of the RC filter 74 and amplifier 72A results in an output of amplifier 72A which is the average of the background signals which are adjacent on either side of the individual sequential signal pulse passed by switch S1. Amplifier 70A then subtracts the individual signal pulse passed by S1 from the average background signal as supplied by amplifier 72A. The resulting demodulated signal is then passed through a filtering stage 80A, including a third amplifier 82. The characteristic band pass characteristic of filter 80A as employed by one embodiment of the invention is shown in FIG. 3b wherein the 12 DB per octave rolloff occurs at about 0.17 Hertz. It will be appreciated that circuits 80B and 80C include components identical to those detailed in circuit 80A.

As will be appreciated by those skilled in the art, circuits 50B and 50C are identical to 50A in their operation except that they allow different signals and background levels to be passed. Specifically, synchronous demodulation circuit 50B will demodulate those pulses corresponding to the optical signal passed by filter 24B at the reference wavelength. Similarly, circuit 50C will operate on those signals corresponding to the optical signals detected through filter 24C at the 3.2 micron wavelength. Note that if the switch control signals are properly coordinated and synchronized, each synchronous demodulation circuit 50A, 50B, and 50C will demodulate independent sequential signal pulses corresponding only to a particular wavelength. That is, circuits 50A, 50B and 50C operate as parallel channels wherein each channel passes only those signals corresponding to a particular place or order in the sequence.

In this example, there will be a repeating sequence of three pulses passed as shown in FIG. 1. The first pulse A might correspond to the signal passed by the 3.2 micron filter 24, the second pulse C would then correspond to the reference filter signal, and the third pulse E would correspond to the signal passed by the 3.4 micron filter. This sequence of pulses would then be repeated with the A pulses all routed, for example, to circuit 50A, the C pulses routed to circuit 50B, and the E pulses routed to circuit 50C. After processing, these signals would result in the outputs $E_{3.2\lambda}$, $E_{REF}$, and $E_{3.4\lambda}$, as shown in FIG. 2. Continuing the example by FIG. 1, in operation, the apparatus would demodulate signal "C" by subtracting the signal level during "C" from half the sum of the background levels "B" and "D". It can be seen that, using this approach, noise on any unused background signal pieces such as "F" does not pass through the demodulator.

Note that in one embodiment of the invention, the detector 14 employed was a lead selenide detector. Of course, the type of detector chosen depends upon the optical wavelengths being sampled. The switches S1, S2, S3, S4, S5 and S6 were semiconductor FET switches. Those skilled in the art will appreciate that other equivalent electrical devices may be employed to carry out the method of the invention.

Now directing attention to FIG. 4, logic signals $\phi_{REF}$, $\phi_{3.2\lambda}$, $\phi_{3.4\lambda}$, $\overline{ALL_{INVERTED}}$, $REF_{BCKGND}$, $3.2\lambda_{BCKGND}$, and $3.4\lambda_{BCKGND}$ are shown. $\phi_{REF}$, $\phi_{3.2\lambda}$, and $\phi_{3.4\lambda}$ comprise logic signals obtained by photo-interrupter 30. $\overline{ALL_{INVERTED}}$ represents the combined inverted logic signal of $\phi_{REF}$, $\phi_{3.2\lambda}$, and $\phi_{3.4\lambda}$. Finally, $REF_{BCKGND}$, $3.2\lambda_{BCKGND}$ and $3.4\lambda_{BCKGND}$ represent the desired logic output signals used for driving the demodulation switches S1-S6.

Figure 5:
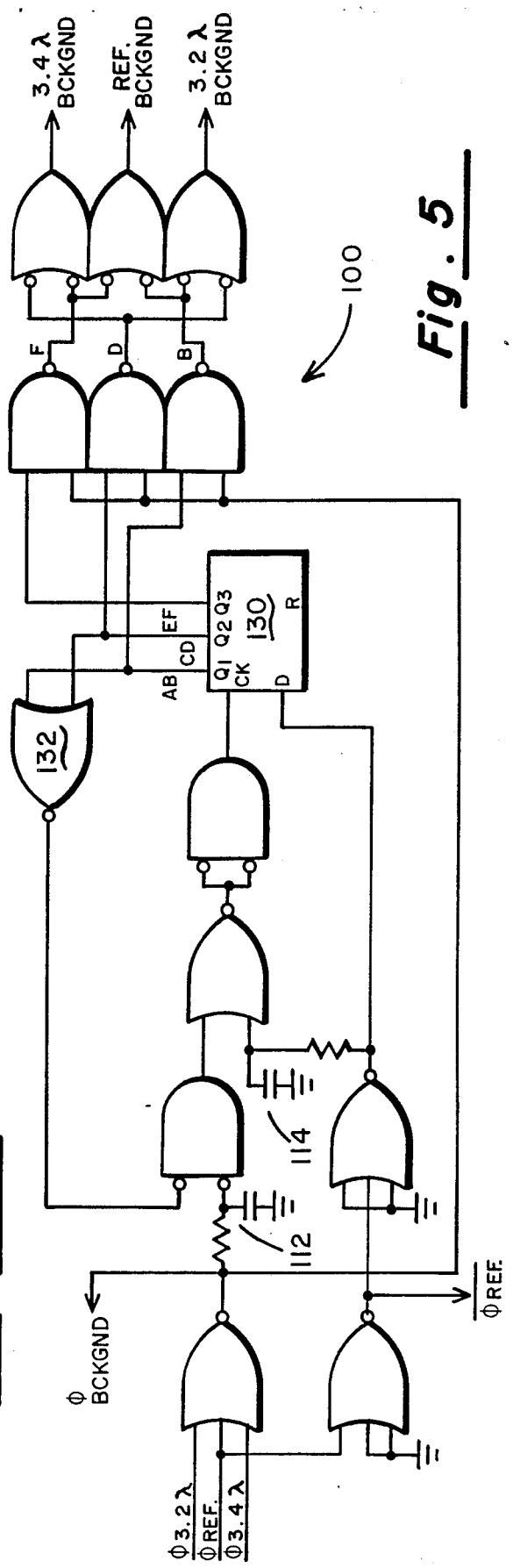
FIG. 5 is a detailed logic circuit diagram of the control logic as employed by one example of an embodiment of the invention.

FIG. 5 shows a detailed circuit diagram of sequential logic circuit 100 which provides the three logic output signals. Logic network 100 is shown for illustrative purposes only as one example of a design which may be employed in the invention to provide the switching signals. Those skilled in the art will recognize that various alternative designs may also be used. Block 130 is a shift register. RC networks 112 and 114 introduce very small time delays to prevent undesired race conditions in the internal feedback loop through NOR gate 132.

This invention has been described herein in considerable detail in order to comply with the Patent Statutes. However, it is to be understood that the invention can be carried out by specifically different equipment and devices, and that various modifications, both as to the equipment details and operating procedures, can be accomplished without departing from the scope of the invention itself.

What is claimed is:

1. Apparatus for accurate low noise demodulation of a modulated multi-signal input waveform, wherein the waveform includes a plurality of sequential signal pulses having a first adjacent background signal immediately preceding and a second adjacent background signal immediately following each signal pulse, wherein the apparatus comprises:
   (a) means for amplifying the modulated multi-signal input waveform;
   (b) means for synchronously separating the sequential signal pulses and their adjacent background signals into a plurality of channels according to sequence order; and
   (c) means for synchronously demodulating each sequential signal pulse in each channel including means for averaging the first and second adjacent background signals for each pulse to yield an adjacent average background signal for each pulse and means for subtracting each sequential signal pulse from the adjacent average background signal.

2. The apparatus of claim 1 wherein the means for synchronously separating the sequential signal pulses into a plurality of channels according to sequence order comprises:
   (a) a synchronizing gate;
   (b) a first logic means responsive to the synchronizing gate wherein the logic means outputs a plurality of sequence control signals; and
   (c) a second logic means which receives and operates on the plurality of sequence control signals so as to provide switching control signals for each of the channels.

3. The apparatus of claim 2 wherein the waveform includes signal pulses having wavelengths in the range between about 3.2 and about 3.4 microns.

4. A method for accurate low noise demodulation of a modulated multi-signal input waveform, wherein the waveform includes a plurality of sequential signal pulses having a first adjacent background signal immediately preceding and a second adjacent background signal immediately following each signal pulse, wherein the method comprises to the steps of:
   (a) amplifying the modulated multi-signal input waveform;
   (b) synchronously separating the sequential signal pulses and their adjacent background signals into a plurality of channels according to sequence order; and
   (c) synchronously demodulating each sequential signal pulse in each channel including the steps of averaging the first and second adjacent background signals for each pulse to yield an adjacent average background signal for each pulse and subtracting each sequential signal pulse from the adjacent average background signal.

5. The method of claim 4 wherein the multi-signal waveform includes signal pulses having wavelengths in the range between about 3.2 and about 3.4 microns.

6. Apparatus for accurate low noise demodulation of a modulated multi-signal waveform for use in a natural gas detection system, wherein the waveform includes a plurality of sequential signal pulses each having a first adjacent background signal immediately preceding and a second adjacent background signal immediately following each signal pulse, wherein the apparatus comprises:
   (a) an air sample tube having an illumination source which transmits light through the tube;
   (b) a means for collecting the transmitted light;
   (c) a chopper wheel disposed to chop the collected light from the air sample tube wherein the chopper wheel includes a plurality of optical filters so as to provide an optically modulated multi-signal output and wherein the chopper wheel further includes filter synchronization gates;
   (d) a detector disposed so as to receive the optically modulated multi-signal output and convert it into a corresponding electrically modulated multi-signal waveform having sequential signal pulses with adjacent background signals;
   (e) means coupled to the detector for amplifying the modulated multi-signal waveform;
   (f) means for synchronously separating the sequential signal pulses and their adjacent background signals into a plurality of channels according to sequence order; and
   (g) means coupled to the amplifying means for synchronously demodulating each sequential signal pulse in each channel including means for averaging the first and second adjacent background signals for each pulse to yield an adjacent average background signal for each pulse and means for subtracting each sequential signal pulse from the adjacent average background signal.

7. The apparatus of claim 3 wherein the waveform includes optical signal pulses corresponding to absorption bands in the range between about 3 and 4 microns.

* * * * *